(12) United States Patent
Pierrot et al.

(10) Patent No.: US 10,887,053 B1
(45) Date of Patent: Jan. 5, 2021

(54) TECHNIQUES FOR DECODING DOWNLINK CONTROL INFORMATION WITH DIFFERENT SIZES IN WIRELESS COMMUNICATIONS

(71) Applicant: QUALCOMM Incorporated, San Diego, CA (US)

(72) Inventors: Alexandre Pierrot, Atlanta, GA (US); Hari Sankar, San Diego, CA (US); Shravan Kumar Reddy Garlapati, San Diego, CA (US); Afshin Haftbaradaran, San Diego, CA (US); Alessandro Risso, San Diego, CA (US); Jae Ho Ryu, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/522,350

(22) Filed: Jul. 25, 2019

(51) Int. Cl.
*H04B 7/00* (2006.01)
*H04L 1/00* (2006.01)
*H04B 17/336* (2015.01)

(52) U.S. Cl.
CPC ......... *H04L 1/0079* (2013.01); *H04B 17/336* (2015.01); *H04L 1/0091* (2013.01)

(58) Field of Classification Search
CPC .... H04L 1/0079; H04L 1/0091; H04B 17/336
See application file for complete search history.

(56) References Cited

U.S. PATENT DOCUMENTS

2010/0279628 A1* 11/2010 Love ............... H04L 5/0091
455/70
2018/0007664 A1* 1/2018 Gho ............... H04W 72/042

* cited by examiner

*Primary Examiner* — Melvin C Marcelo
(74) *Attorney, Agent, or Firm* — Dalei Dong; Arent Fox LLP (57) ABSTRACT

Aspects described herein relate to decoding downlink control information (DCI) based on multiple DCI sizes. A first hypothesis of multiple hypotheses for decoding a communication received in a control channel search space, wherein the multiple hypotheses are based on different corresponding DCI sizes can be determined. The communication received in the control channel search space can be decoded based on the first hypothesis. For each of the multiple hypotheses and based on the different corresponding DCI sizes, information bits can be extracted from the communication as decoded. For each extracting of the information bits, cyclic redundancy check (CRC) can be performed based on one of the different corresponding DCI sizes to determine whether extracting of the information bits yields DCI.

30 Claims, 4 Drawing Sheets

TECHNIQUES FOR DECODING DOWNLINK CONTROL INFORMATION WITH DIFFERENT SIZES IN WIRELESS COMMUNICATIONS

BACKGROUND

Aspects of the present disclosure relate generally to wireless communication systems, and more particularly, to decoding downlink control information (DCI).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband (eMBB) addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication systems, DCI can be transmitted over a downlink control channel search space, and user equipment (UEs) can attempt to blindly decode the DCI as received over the search space. For example, the blind decoding can be based on multiple hypotheses regarding an aggregation level used in encoding the DCI, control channel element (CCE) size, and/or other parameters. The UE can attempt to decode communications in the downlink control channel search space based on the hypotheses and can attempt to perform a cyclic redundancy check (CRC) based on DCI size to determine whether decoding is successful.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes determining a first hypothesis of multiple hypotheses for decoding a communication received in a control channel search space, wherein the multiple hypotheses are based on different corresponding downlink control information (DCI) sizes, decoding, based on the first hypothesis, the communication received in the control channel search space, extracting, for each of the multiple hypotheses and based on the different corresponding DCI sizes, information bits from the communication as decoded, and performing, for each extracting of the information bits, cyclic redundancy check (CRC) based on one of the different corresponding DCI sizes to determine whether extracting of the information bits yields DCI.

In another example, an apparatus for wireless communication is provided that includes a transceiver, a memory configured to store instructions, and one or more processors communicatively coupled with the transceiver and the memory. The one or more processors are configured to determine a first hypothesis of multiple hypotheses for decoding a communication received in a control channel search space, wherein the multiple hypotheses are based on different corresponding DCI sizes, decode, based on the first hypothesis, the communication received in the control channel search space, extract, for each of the multiple hypotheses and based on the different corresponding DCI sizes, information bits from the communication as decoded, and perform, for each extracting of the information bits, CRC based on one of the different corresponding DCI sizes to determine whether extracting of the information bits yields DCI.

In another example, an apparatus for wireless communication is provided that includes means for determining a first hypothesis of multiple hypotheses for decoding a communication received in a control channel search space, wherein the multiple hypotheses are based on different corresponding DCI sizes, means for decoding, based on the first hypothesis, the communication received in the control channel search space, means for extracting, for each of the multiple hypotheses and based on the different corresponding DCI sizes, information bits from the communication as decoded, and means for performing, for each extracting of the information bits, CRC based on one of the different corresponding DCI sizes to determine whether extracting of the information bits yields DCI.

In another example, a computer-readable medium is provided that includes code executable by one or more processors for wireless communication. The code includes code for determining a first hypothesis of multiple hypotheses for decoding a communication received in a control channel search space, wherein the multiple hypotheses are based on different corresponding DCI sizes, decoding, based on the first hypothesis, the communication received in the control channel search space, extracting, for each of the multiple hypotheses and based on the different corresponding DCI sizes, information bits from the communication as decoded, and performing, for each extracting of the information bits, CRC based on one of the different corresponding DCI sizes to determine whether extracting of the information bits yields DCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to jointly decoding downlink control information (DCI) with different DCI sizes. For example, due to the nested structure of Polar codes, it may be possible to decode, at once, multiple DCIs with different DCI sizes. For example, DCIs having some similar parameters may be jointly decoded in this regard. For example, the DCIs can have the same input log likelihood ratios (LLRs) (e.g., same rate match sizes, scrambling seeds, control-resource sets (CORESETs), control channel element (CCE) offsets, etc.), same information order (e.g., same codeword size, same rate match mode, etc.), and/or the like. When such conditions are met, for example, multiple DCI sizes can be grouped for decoding in a single decoding with a significant performance penalty. For example, a single decoding can be performed with a cyclic redundancy check (CRC) performed for each of the multiple DCI sizes to yield the multiple DCIs, as described further herein. Grouping the DCI sizes in this regard can allow for reducing processing and/or latency required to decode multiple DCI by allowing the single decoding for the multiple sizes.

Grouping DCI sizes for decoding, in this regard, can be performed in various scenarios. For example, grouping of DCI sizes for decoding can be performed based on a timeline budget to improve a worst case timeline. In this example, grouping of DCI sizes can be performed for all configured DCI sizes or for a portion thereof. For example, where the UE is configured with four possible DCI sizes, grouping of DCI sizes for decoding can be used for all four possible DCI sizes, for two groups of two possible DCI sizes, or with no grouping. In another example, grouping of DCI sizes for decoding can be opportunistically performed. In this example, grouping of DCI sizes can be based on determining an acceptable target loss and grouping DCI sizes for decoding where the size gap between DCI sizes achieves the acceptable target loss. In another example, DCI size grouping can be enabled based on a signal-to-noise ratio (SNR) threshold. In this example, DCI size grouping can be enabled where the radio conditions are determined to be high enough such that little or no performance loss is incurred in the decoding, processing and/or latency gains can be achieved by performing a lesser number of decodes.

The described features will be presented in more detail below with reference to FIGS. 1-4.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Figure 1:
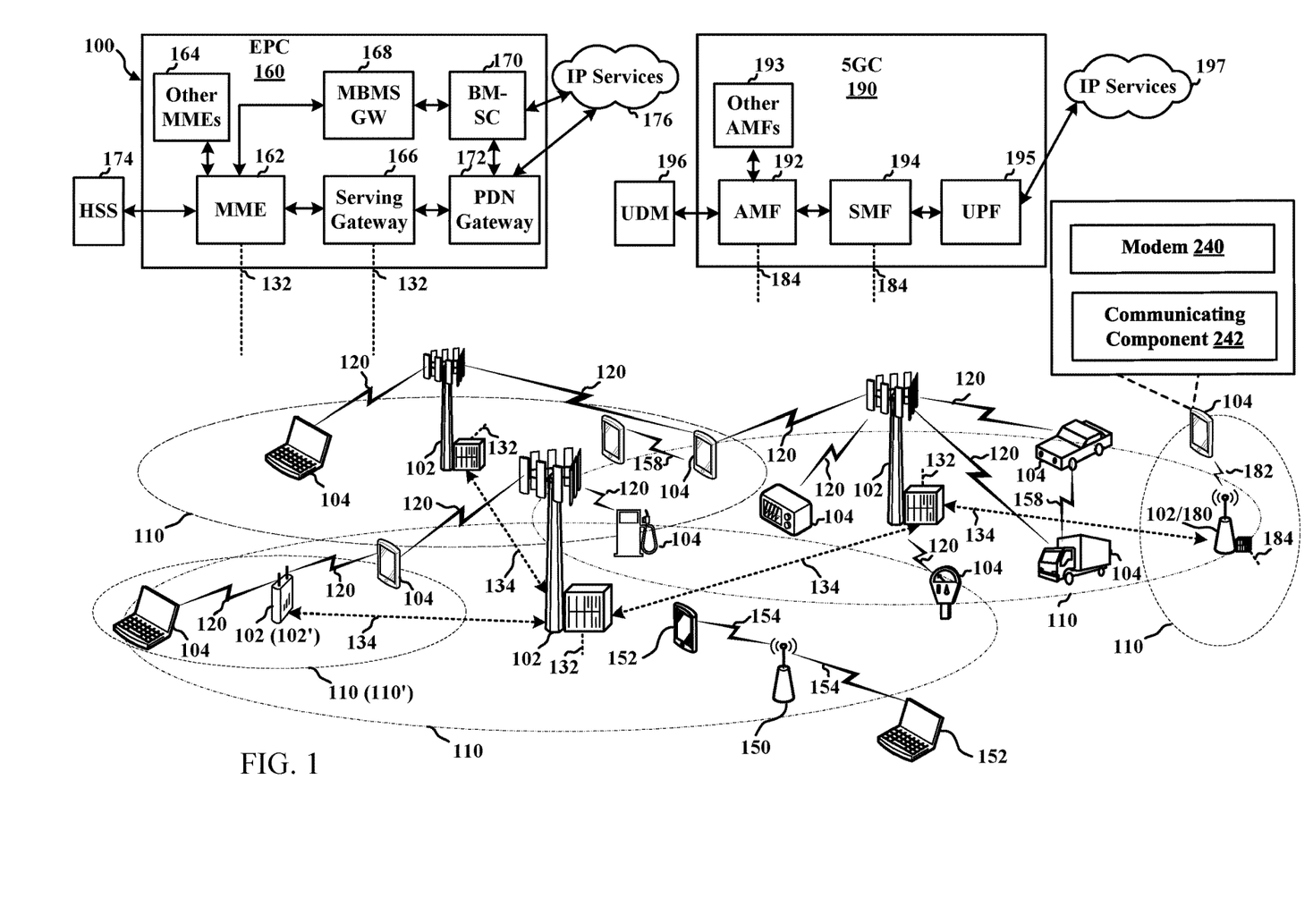
FIG. 1 illustrates an example of a wireless communication system, in accordance with various aspects of the present disclosure.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for receiving DCI and performing joint decoding of DCIs having different DCI sizes.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, base station 102 can transmit DCI to a UE 104 to provide downlink control information. The base station 102 can transmit the DCI in a downlink control channel search space, as described, which may include a common search space (CSS), UE-specific search space (DESS), etc. In addition, in an example, the base station 102 can transmit multiple DCIS, which may be of different DCI sizes, over the search space, and may encode the multiple DCIS based on one or more parameters, such as an aggregation level, control channel element (CCE) size, etc. A UE 104 can receive communications from the base station 102 over resources defined for the downlink control channel search space. In this example, communicating component 242 can attempt to decode DCI in the search space based on multiple hypotheses, where each hypothesis can be based on configured possible parameters used to encode the DCI. As described further herein, in some examples, communicating component 242 can group DCI sizes of different hypotheses such to perform a single decoding for the group of DCI sizes and perform separate CRC for each DCI size to potentially decode multiple DCIs using a single decode.

Figure 2:
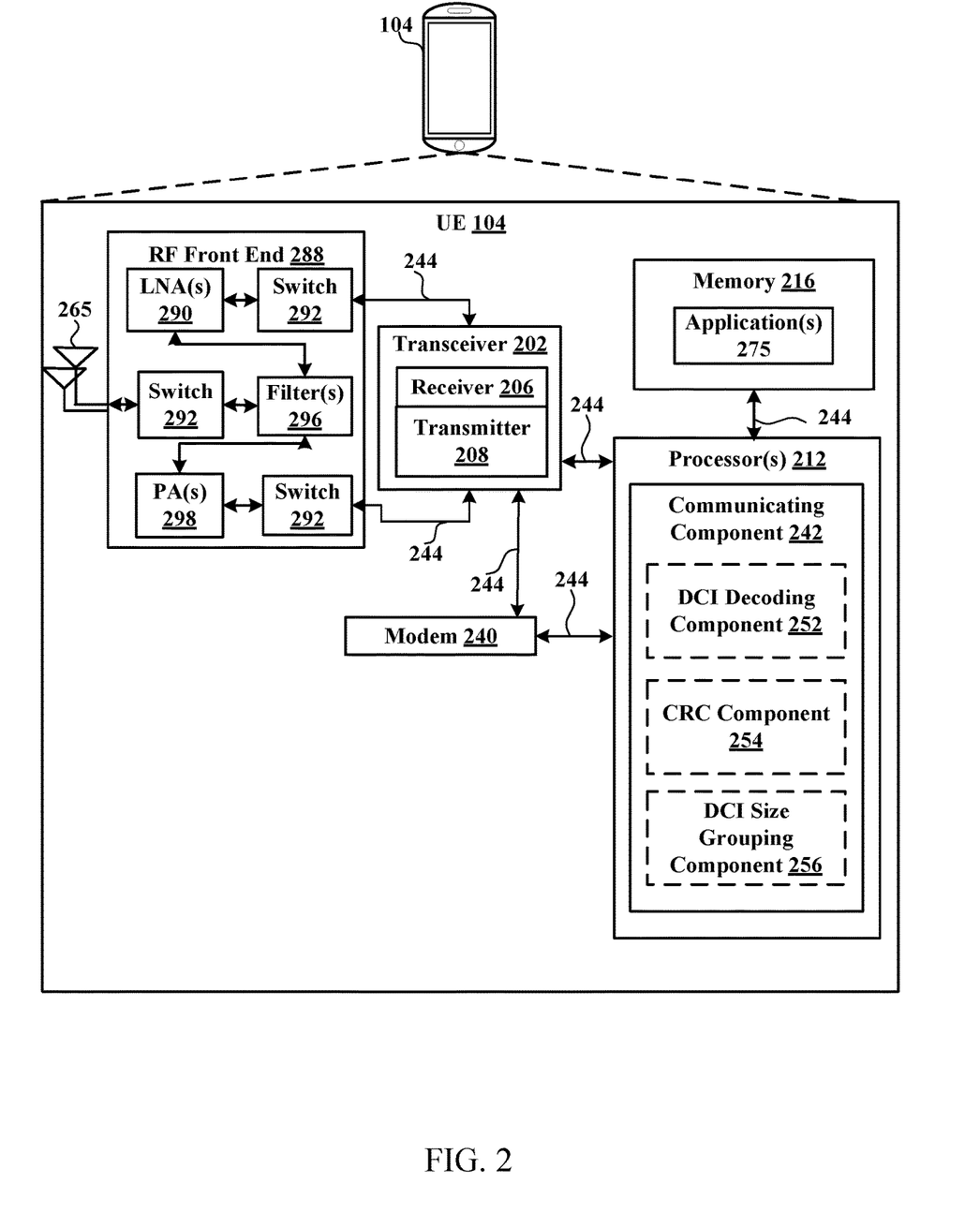
FIG. 2 is a block diagram illustrating an example of a UE, in accordance with various aspects of the present disclosure.
Figure 3:
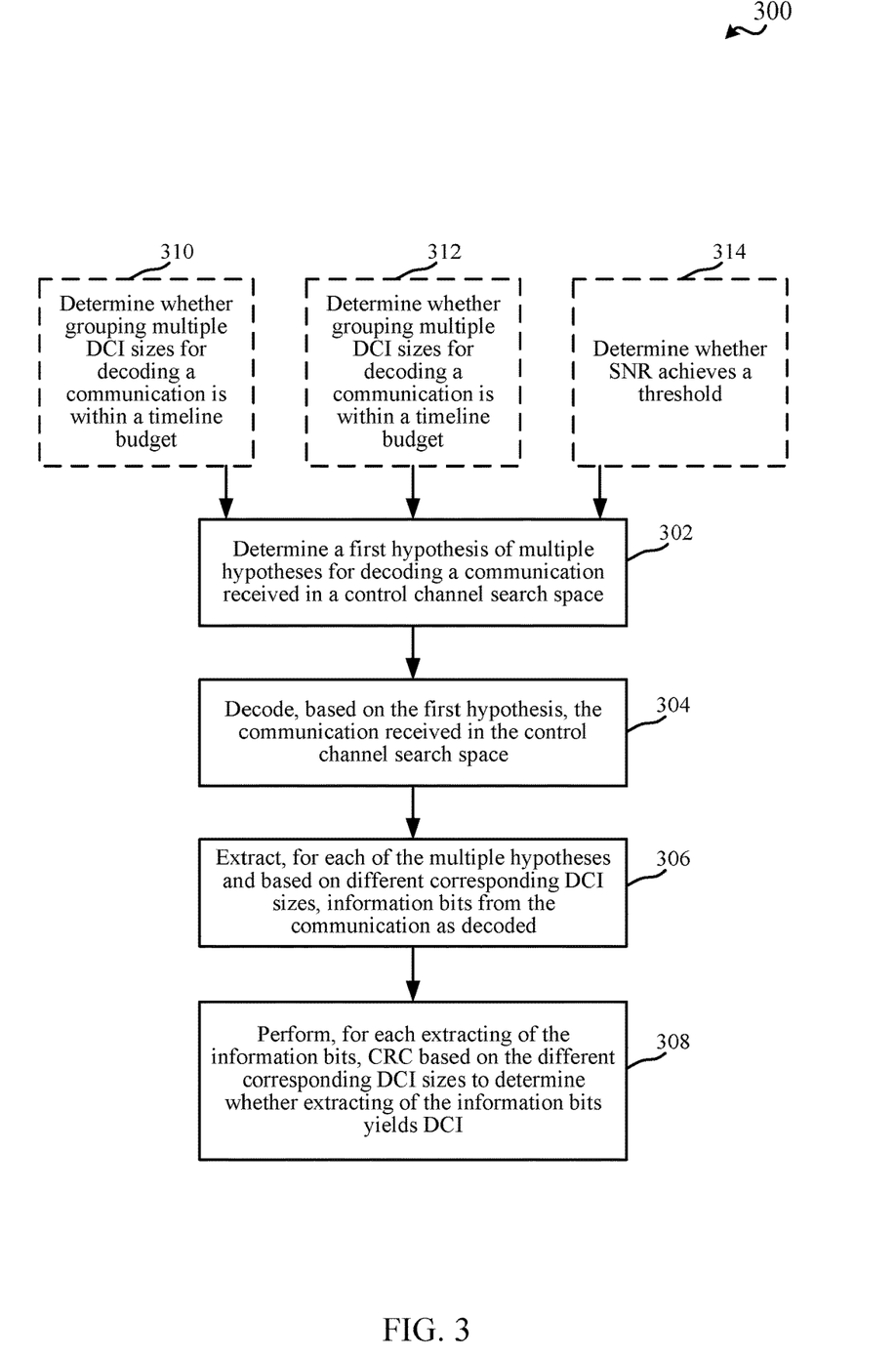
FIG. 3 is a flow chart illustrating an example of a method for decoding downlink control information (DCI) based on different DCI sizes, in accordance with various aspects of the present disclosure.
Figure 4:
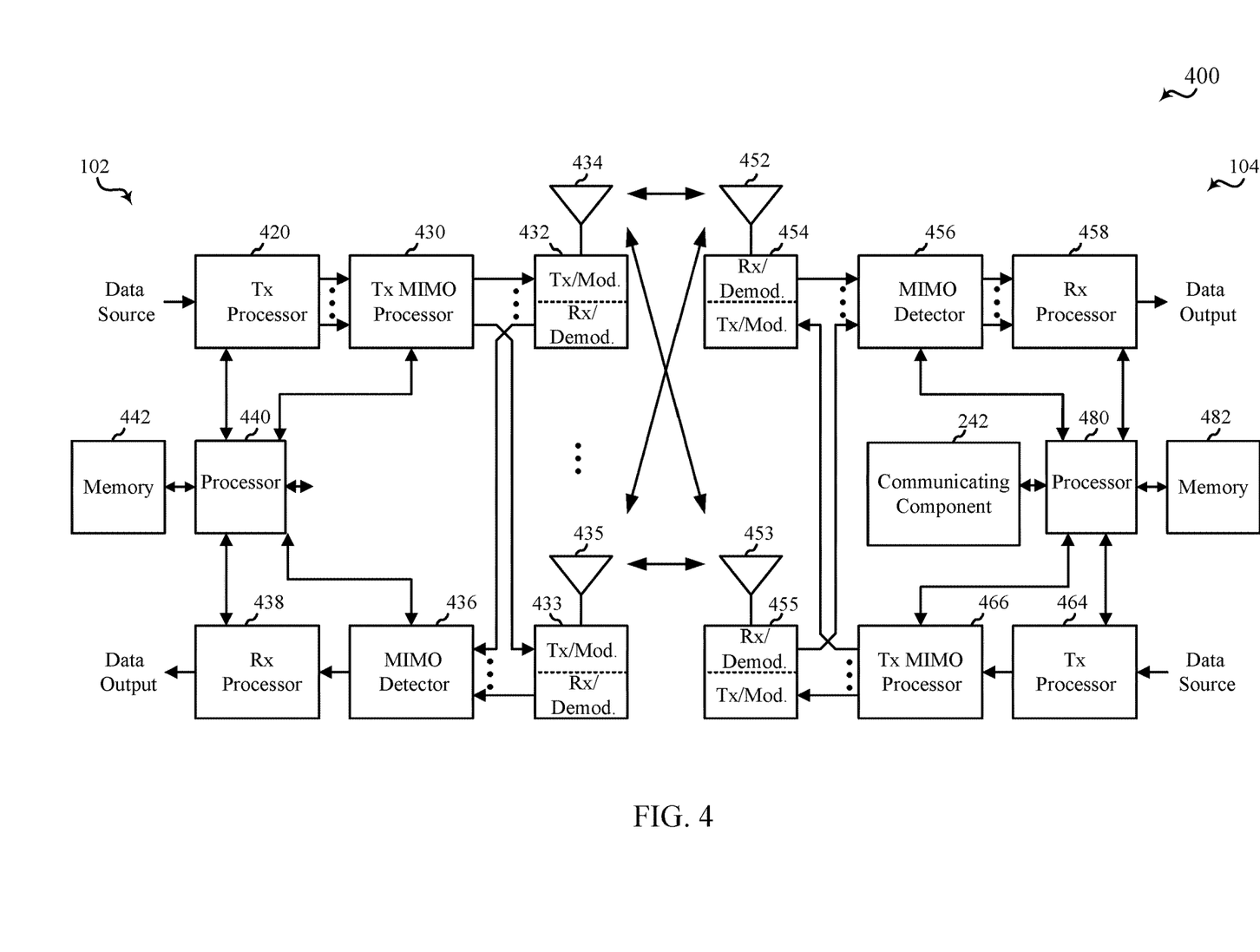
FIG. 4 is a block diagram illustrating an example of a MIMO communication system including a base station and a UE, in accordance with various aspects of the present disclosure.

Turning now to FIGS. 2-4, aspects are depicted with reference to one or more components and one or more methods that may perform the actions or operations described herein, where aspects in dashed line may be optional. Although the operations described below in FIG. 3 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for jointly decoding multiple DCIs based on different DCI sizes.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a DCI decoding component 252 for performing one decoding for multiple DCIs based on at least a first DCI size, a CRC component 254 for performing CRC of the decoded DCIs based on multiple DCI sizes corresponding to multiple decoding hypotheses, and/or a DCI size grouping component 256 for determine a grouping of DCI sizes for which to perform the single decoding and multiple CRCs.

In an aspect, the processor(s) 212 may correspond to one or more of the processors described in connection with the UE in FIG. 4. Similarly, the memory 216 may correspond to the memory described in connection with the UE in FIG. 4.

FIG. 3 illustrates a flow chart of an example of a method 300 for decoding DCIs based on different DCI sizes in accordance with aspects described herein. In one example, a UE 104 can perform the functions described in method 300 using one or more of the components described in FIGS. 1 and 2.

In method 300, at Block 302, a first hypothesis of multiple hypotheses can be determined for decoding a communication received in a control channel search space. In an aspect, DCI decoding component 252, e.g., in conjunction with processor(s) 212, memory 216, transceiver 202, communicating component 242, etc., can determine the first hypothesis for the multiple hypotheses for decoding a communication received in a control channel search space.

For example, the UE 104 can be configured (e.g., by the base station 102) with multiple possible aggregation levels, CCE sizes, etc. that the base station 102 may use to encode DCI transmitted in the control channel search space. In addition, DCI can be associated with different DCI sizes (e.g., a DCI format may be associated with a DCI size, which may vary among DCI formats). In an example, DCI sizes for the different DCI formats (and/or ranges of sizes) can be configured for the UE 104 as well (e.g., by the base station 102). Thus, for example, there can be multiple hypotheses for attempting to blindly decode DCI from the control channel search space, where there can be hypotheses for each combination of possible aggregation level, possible CCE size, possible DCI size, and/or the like. As described above, due to nested structure of Polar codes used by the base station 102 to encode DCI, it may be possible to group a portion of DCI sizes such to use a single decode for multiple DCIs having different DCI sizes to yield the DCI transmitted by the base station 102.

For example, DCI decoding component 252 can determine the first hypothesis of multiple hypotheses for decoding a communication received in the control channel search space based on one or more considerations. For example, DCI decoding component 252 can determine the first hypothesis at one of the multiple hypotheses that has a largest DCI size. In another example, DCI decoding component 252 can additionally or alternatively determine the first hypothesis of the multiple hypotheses based on detecting that the multiple hypotheses are associated with the same input LLRs (e.g., same rate match sizes, scrambling seeds, CORESETs, CCE offsets, etc.), with the same information order (e.g., same codeword size, same rate match mode, etc.), and/or the like. In yet another example, as described further herein, DCI decoding component 252 can determine the first hypothesis based on determining that a timeline budget for decoding DCI allows for grouping the different corresponding DCI sizes of the multiple hypotheses based on the DCI size of the first hypothesis.

In method 300, at Block 304, the communication received in the control channel search space can be decoded based on the first hypothesis. In an aspect, DCI decoding component 252, e.g., in conjunction with processor(s) 212, memory 216, transceiver 202, communicating component 242, etc., can decode, based on the first hypothesis, the communication received in the control channel search space. As described in this regard, DCI decoding component 252 can perform a single decoding of the communication based on the first hypothesis and associated DCI size. DCI decoding component 252 can perform the decoding to obtain a number N of decoded codeword bits. In an example, N can be another parameter of the multiple hypotheses (and can be the same for each of the multiple hypotheses), such that N can be used as an input for decoding the codewords from the communication received over the control channel search space. For DCI that is based on the other DCI size(s), decoding the communication using the first hypothesis may result in some performance loss in decoding, but this may be outweighed by the processing and/or latency gain by doing a single decode for multiple DCI sizes.

In method 300, at Block 306, information bits can be extracted, for each of the multiple hypotheses and based on different corresponding DCI sizes, from the communication as decoded. In an aspect, DCI decoding component 252, e.g., in conjunction with processor(s) 212, memory 216, transceiver 202, communicating component 242, etc., can extract, for each of the multiple hypotheses and based on different corresponding DCI sizes, information bits from the communication as decoded. For example, DCI decoding component 252 can extract the information bits from the N decoded codewords and based on a corresponding DCI size. In this example, DCI decoding component 252 can extract first information bits based on the first hypothesis and corresponding DCI size, second information bits based on the second hypothesis and corresponding DCI size, etc. for each hypothesis.

In method 300, at Block 308, CRC can be performed for each extracting of information bits based on the different corresponding DCI sizes to determine whether extracting of the information bits yields DCI. In an aspect, CRC component 254, e.g., in conjunction with processor(s) 212, memory 216, transceiver 202, communicating component 242, etc., can perform, for each extracting of the information bits, CRC based on the different corresponding DCI sizes to determine whether extracting of the information bits yields DCI. For example, CRC component 254 can perform CRC for the first information bits based on the DCI size corresponding to the first hypothesis, CRC for the second information bits based on the DCI size corresponding to the second hypothesis, etc. For each set of extracted information bits (e.g., the first information bits, second information bits, etc.), CRC component 254 can perform CRC to determine whether the information bits yield DCI, and DCI decoding component 252 can accordingly obtain multiple DCIs from the single decoding (e.g., where the associated CRCs are successful).

A specific example of DCI sizes (K), aggregation levels (AL1, AL2, AL4, AL8, AL16), and codeword sizes (N) defined for use in 5G NR is shown below.

| K | AL1 | AL2 | AL4 | AL8 | AL16 |
|---|---|---|---|---|---|
| 36-47 | N = 128 Puncturing | N = 256 Puncturing | N = 512 Puncturing | N = 512 Repetition | |
| 48-94 | N = 128 | | | | |
| 95-108 | Shortening | N = 256 | | | |
| 109-164 | N/A | Shortening | | | |

DCI decoding component 252 can group DCI sizes for hypotheses, as described above, having the same codeword size and rate match mode (e.g., puncturing, shortening, repetition).

In a specific example, for a generated PDCCH search space, a UE 104 may be configured with the following hypotheses: Hypothesis 1: AL8, DCI Size 68 bits, and Hypothesis 2: AL8, DCI Size 72 bits, where the other decoding parameters are the same. This example may be common in the case of NR, where the UE 104 can monitor for DCI formats 0_1 and 1_1 together. In this example, DCI decoding component 252 can group the DCI sizes, and can accordingly decode communications received in the PDCCH search space using both hypotheses based on size 72 bits. DCI decoding component 252 can recover the N "U-domain" decoded codewords of length N (e.g., 512 based on the above table). For Hypothesis 1, DCI decoding component 252 can extract 68 information bits, and CRC component 254 can check CRC based on 68 bits. For Hypothesis 2, DCI decoding component 252 can extract 72 information bits, and CRC component 254 can check CRC based on 72 bits. Thus, for these two hypotheses, DCI decoding component 252 can perform one decode, and CRC component 254 can perform two CRC checks. A performance loss may be incurred by the smallest size (68 bits), which takes on the performance of the largest size (72 bits).

In addition, in NR, eight different DCI formats are defined, including Format 0_0: UL DCI with small payload (e.g., formats 0_0 and/or 1_0), Format 0_1: UL DCI with large payload, Format 1_0: DL DCI with small payload (e.g., fallback), Format 1_1: DL DCI with potentially large payload, (e.g. formats 2_0, 2_1, 2_2 and/or 2_3). Different padding and dropping rules may guarantee that, in any slot, no more than 4 different sizes need to be monitored. For example, $K_0$: 0_0 and 1_0 for CSS, and 2_2/2_3 are padded to the same size. $K'_0$: 0_0 and 1_1 for UESS are padded to the same size if total number of DCI size is less than 4 otherwise it is padded to size $K_0$. $K_1$: 1_0, $K_2$: 1_1, $K_3$: 2_0, $K_4$: 2_1. $K'_0$ and $K_1/K_2$ may never be monitored at the same time. Thus, for example, the multiple hypotheses may include four hypotheses or a subset of four hypotheses that are determined to have the same codeword size and/or other decoding parameters.

In another example, DCI size grouping component 256 can determine whether to group DCI sizes at all in decoding the DCI (as described above) and/or whether to group a number of DCI sizes less than the total corresponding DCI sizes for the hypotheses based on one or more considerations. For example, in method 300, optionally at Block 310, it can be determined whether grouping multiple DCI sizes for decoding a communication is within a timeline budget. In an aspect, DCI size grouping component 256, e.g., in conjunction with processor(s) 212, memory 216, transceiver 202, communicating component 242, etc., can determine whether grouping the multiple DCI sizes for decoding the communication is within the timeline budget. For example, grouping the multiple DCI sizes such to lessen decoding time may improve a worst case timeline for decoding the multiple DCIs. For example, if the timeline budget allows, DCI grouping component 256 may determine to not group DCI sizes, and DCI decoding component 252 can perform separate decoding for each DCI size. If, however, the timeline budget does not allow separate decoding for each DCI size, DCI grouping component 256 may determine to group DCI sizes into one or more multiple groups for decoding.

For example, where there are four possible DCI sizes, DCI grouping component 256 may determine to group two of the DCI sizes in a first group and the other two DCI sizes in a second group. In this example, DCI decoding component 252 can perform DCI coding for each group as described above, where the multiple hypotheses can be the hypotheses in a given group. In another example, DCI grouping component 256 may determine to group all four DCI sizes in a single group (e.g., where DCI grouping component 256 determines that the timeline budget also does not allow for grouping into two groups), etc.

In another example, DCI size grouping component 256 can determine whether to group DCI sizes based on opportunistic considerations. For example, in method 300, optionally at Block 312, it can be determined whether grouping multiple DCI sizes results in decoding loss that is within a threshold loss. In an aspect, DCI size grouping component 256, e.g., in conjunction with processor(s) 212, memory 216, transceiver 202, communicating component 242, etc., can determine whether grouping multiple DCI sizes results in decoding loss that is within the target loss. For example, DCI size grouping component 256 can determine whether a difference in DCI sizes (also referred to herein as a size gap) achieves the target loss, and if so, DCI size grouping component 256 can group two or more of the DCI sizes for joint decoding described above (e.g., where the determined group of DCI sizes correspond to the multiple hypotheses).

In another example, DCI size grouping component 256 can determine whether to group DCI sizes based on other considerations. For example, in method 300, optionally at Block 314, it can be determined whether a SNR achieves a threshold. In an aspect, DCI size grouping component 256, e.g., in conjunction with processor(s) 212, memory 216, transceiver 202, communicating component 242, etc., can determine whether the SNR achieves the threshold. For example, the SNR can relate to an SNR of the signal from which the DCIs are being decoded. In addition, for example, the threshold may be configured at the UE 104 as a desirable threshold for grouping DCI sizes for performing decoding. In addition, there can be multiple thresholds for grouping the DCI sizes into multiple groups (e.g., a first threshold for grouping two DCI sizes, a second threshold for grouping three or four DCI sizes, etc.). In this example, where the SNR is above a certain threshold, which can be determined to guarantee or increase the probability of no loss when DCI size grouping is enabled, DCI size grouping component 256 can enable DCI size grouping and can accordingly perform the above-described functions for grouping DCI sizes. Where the SNR is determined to not achieve the threshold, DCI size grouping component 256 may not enable DCI size grouping. This can guarantee or increase a likelihood that no performance loss is incurred in the decoding, while processing and/or timeline gains can be achieved by performing a lesser number of decodes.

For example, where the target loss (e.g., target signal-to-noise ratio (SNR) loss) is 0.5 dB, and 0.5 dB/10 bit loss is accounted for, DCI size grouping component 256 can group DCI sizes that are within a 10-bit range of each other. In one example, DCI size grouping component 256 can determine one or more of the target loss, the bit loss, or the bit range for DCI size grouping based on a configuration stored in UE 104 or otherwise received from the network (e.g., from base station 102 or other components). In one example, for four possible DCI sizes where the processor(s) 212 can support DCI groups/bucket sizes of 1, 2, 3, or 4, DCI size grouping component 256 can group the DCI sizes based on sorting the four DCI sizes in decreasing order $[\kappa_0, \kappa_1, \kappa_2, \kappa_3]$. If $\kappa_0 - \kappa_3 \leq 10$ DCI size grouping component 256 can group all four DCI sizes in a single bucket of size 4, and/or DCI decoding component 252 can perform DCI decoding for the DCI sizes in the bucket based on the largest DCI size, as described above. If $\kappa_0 - \kappa_2 \leq 10$, DCI size grouping component 256 can group DCI sizes $\{\kappa_0, \kappa_1, \kappa_2\}$ in a bucket of size 3, and $\kappa_3$ separately, and/or DCI decoding component 252 can perform DCI decoding for the DCI sizes in the bucket based on the largest DCI size, and separately perform DCI decoding for $\kappa_3$, as described above. If $\kappa_1 - \kappa_3 \leq 10$, DCI size grouping component 256 can group DCI sizes $\{\kappa_1, \kappa_2, \kappa_3\}$ in a bucket of size 3, and $\kappa_0$ separately, and/or DCI decoding component 252 can perform DCI decoding for the DCI sizes in the bucket based on the largest DCI size, and separately perform DCI decoding for $\kappa_0$, as described above. If $\kappa_0 - \kappa_1 \leq 10$ and $\kappa_2 - \kappa_3 \leq 10$, DCI size grouping component 256 can group DCI sizes $\{\kappa_0, \kappa_1\}$ in a bucket of size 2 and group DCI sizes $\{\kappa_2, \kappa_3\}$ in another bucket of size 2, and/or DCI decoding component 252 can perform separate DCI decoding for each bucket based on the largest DCI size, as described above. Otherwise, in an example, DCI size grouping component 256 can determine to perform no grouping.

FIG. 4 is a block diagram of a MIMO communication system 400 including a base station 102 and a UE 104. The MIMO communication system 400 may illustrate aspects of the wireless communication access network 100 described with reference to FIG. 1. The base station 102 may be an example of aspects of the base station 102 described with reference to FIG. 1. The base station 102 may be equipped with antennas 434 and 435, and the UE 104 may be equipped with antennas 452 and 453. In the MIMO communication system 400, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 420 may receive data from a data source. The transmit processor 420 may process the data. The transmit processor 420 may also generate control symbols or reference symbols. A transmit MIMO processor 430 may perform spatial processing (e.g., precoding) on data symbols, control symbols, or reference symbols, if applicable, and may provide output symbol streams to the transmit modulator/demodulators 432 and 433. Each modulator/demodulator 432 through 433 may process a respective output symbol stream (e.g., for OFDM, etc.) to obtain an output sample stream. Each modulator/demodulator 432 through 433 may further process (e.g., convert to analog, amplify, filter, and upconvert) the output sample stream to obtain a DL signal. In one example, DL signals from modulator/demodulators 432 and 433 may be transmitted via the antennas 434 and 435, respectively.

The UE 104 may be an example of aspects of the UEs 104 described with reference to FIGS. 1-2. At the UE 104, the UE antennas 452 and 453 may receive the DL signals from the base station 102 and may provide the received signals to the modulator/demodulators 454 and 455, respectively. Each modulator/demodulator 454 through 455 may condition (e.g., filter, amplify, downconvert, and digitize) a respective received signal to obtain input samples. Each modulator/demodulator 454 through 455 may further process the input samples (e.g., for OFDM, etc.) to obtain received symbols. A MIMO detector 456 may obtain received symbols from the modulator/demodulators 454 and 455, perform MIMO detection on the received symbols, if applicable, and provide detected symbols. A receive (Rx) processor 458 may process (e.g., demodulate, deinterleave, and decode) the detected symbols, providing decoded data for the UE 104 to a data output, and provide decoded control information to a processor 480, or memory 482.

The processor 480 may in some cases execute stored instructions to instantiate a communicating component 242 (see e.g., FIGS. 1 and 2).

On the uplink (UL), at the UE 104, a transmit processor 464 may receive and process data from a data source. The transmit processor 464 may also generate reference symbols for a reference signal. The symbols from the transmit processor 464 may be precoded by a transmit MIMO processor 466 if applicable, further processed by the modulator/demodulators 454 and 455 (e.g., for SC-FDMA, etc.), and be transmitted to the base station 102 in accordance with the communication parameters received from the base station 102. At the base station 102, the UL signals from the UE 104 may be received by the antennas 434 and 435, processed by the modulator/demodulators 432 and 433, detected by a MIMO detector 436 if applicable, and further processed by a receive processor 438. The receive processor 438 may provide decoded data to a data output and to the processor 440 or memory 442.

The components of the UE 104 may, individually or collectively, be implemented with one or more ASICs adapted to perform some or all of the applicable functions in hardware. Each of the noted modules may be a means for performing one or more functions related to operation of the MIMO communication system 400. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 400.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples of the present invention is provided:

1. A method of wireless communication, comprising:
   determining a first hypothesis of multiple hypotheses for decoding a communication received in a control channel search space, wherein the multiple hypotheses are based on different corresponding downlink control information (DCI) sizes;
   decoding, based on the first hypothesis, the communication received in the control channel search space;
   extracting, for each of the multiple hypotheses and based on the different corresponding DCI sizes, information bits from the communication as decoded; and
   performing, for each extracting of the information bits, cyclic redundancy check (CRC) based on one of the different corresponding DCI sizes to determine whether extracting of the information bits yields DCI.

2. The method of example 1, wherein determining the first hypothesis comprises determining which of the multiple hypotheses corresponds to a largest DCI size.

3. The method of any of examples 1 or 2, wherein determining the first hypothesis is based at least in part on determining the multiple hypotheses correspond to at least one of a same codeword size and a same rate match mode.

4. The method of any of examples 1 to 3, wherein determining the first hypothesis is based at least in part on determining the multiple hypotheses correspond to one or more parameters of input LLR.

5. The method of any of examples 1 to 4, wherein determining the first hypothesis is based at least in part on determining that a timeline budget allows for grouping the different corresponding DCI sizes based on a DCI size of the first hypothesis.

6. The method of example 5, wherein determining that the timeline budget allows for grouping the different corresponding DCI sizes comprises determining, based on the timeline budget and from a number of configured DCI sizes, the different corresponding DCI sizes to include in the grouping.

7. The method of any of examples 1 to 6, wherein determining the first hypothesis is based at least in part on determining at least one of a size gap between the different corresponding DCI sizes of the multiple hypotheses or that the size gap achieves a target loss.

8. The method of example 7, further comprising grouping, based at least in part on the size gap, the different corresponding DCI sizes of the multiple hypotheses from a number of configured DCI sizes.

9. The method of any of examples 1 to 8, wherein determining the first hypothesis is based at least in part on determining whether a signal-to-noise ratio of the communication achieves a threshold.

10. An apparatus for wireless communication, comprising:
   a transceiver;
   a memory configured to store instructions; and
   one or more processors communicatively coupled with the transceiver and the memory, wherein the one or more processors are configured to:
      determine a first hypothesis of multiple hypotheses for decoding a communication received in a control channel search space, wherein the multiple hypotheses are based on different corresponding downlink control information (DCI) sizes;
      decode, based on the first hypothesis, the communication received in the control channel search space;
      extract, for each of the multiple hypotheses and based on the different corresponding DCI sizes, information bits from the communication as decoded; and
      perform, for each extracting of the information bits, cyclic redundancy check (CRC) based on one of the different corresponding DCI sizes to determine whether extracting of the information bits yields DCI.

11. The apparatus of example 10, wherein the one or more processors are configured to determine the first hypothesis based at least in part on determining which of the multiple hypotheses corresponds to a largest DCI size.

12. The apparatus of any of examples 10 or 11, wherein the one or more processors are configured to determine the first hypothesis based at least in part on determining the multiple hypotheses correspond to at least one of a same codeword size and a same rate match mode.

13. The apparatus of any of examples 10 to 12, wherein the one or more processors are configured to determine the first hypothesis based at least in part on determining the multiple hypotheses correspond to one or more parameters of input LLR.

14. The apparatus of any of examples 10 to 13, wherein the one or more processors are configured to determine the first hypothesis based at least in part on determining that a timeline budget allows for grouping the different corresponding DCI sizes based on a DCI size of the first hypothesis.

15. The apparatus of example 14, wherein determining that the timeline budget allows for grouping the different corresponding DCI sizes comprises determining, based on the timeline budget and from a number of configured DCI sizes, the different corresponding DCI sizes to include in the grouping.

16. The apparatus of any of examples 10 to 15, wherein the one or more processors are configured to determine the first hypothesis based at least in part on determining at least one of a size gap between the different corresponding DCI sizes of the multiple hypotheses or that the size gap achieves a target loss.

17. The apparatus of example 16, wherein the one or more processors are further configured to group, based at least in part on the size gap, the different corresponding DCI sizes of the multiple hypotheses from a number of configured DCI sizes.

18. The apparatus of any of examples 10 to 17, wherein the one or more processors are configured to determine the first hypothesis based at least in part on determining whether a signal-to-noise ratio of the communication achieves a threshold.

19. An apparatus for wireless communication, comprising:
    means for determining a first hypothesis of multiple hypotheses for decoding a communication received in a control channel search space, wherein the multiple hypotheses are based on different corresponding downlink control information (DCI) sizes;
    means for decoding, based on the first hypothesis, the communication received in the control channel search space;
    means for extracting, for each of the multiple hypotheses and based on the different corresponding DCI sizes, information bits from the communication as decoded; and
    means for performing, for each extracting of the information bits, cyclic redundancy check (CRC) based on one of the different corresponding DCI sizes to determine whether extracting of the information bits yields DCI.

20. The apparatus of example 19, wherein the means for determining determines the first hypothesis based at least in part on determining which of the multiple hypotheses corresponds to a largest DCI size.

21. The apparatus of any of examples 19 or 20, wherein the means for determining determines the first hypothesis based at least in part on at least one of: determining the multiple hypotheses correspond to at least one of a same codeword size and a same rate match mode; or determining the multiple hypotheses correspond to one or more parameters of input LLR.

22. The apparatus of any of examples 19 to 21, wherein the means for determining determines the first hypothesis based at least in part on determining that a timeline budget allows for grouping the different corresponding DCI sizes based on a DCI size of the first hypothesis.

23. The apparatus of any of examples 19 to 22, wherein the means for determining determines the first hypothesis based at least in part on determining at least one of a size gap between the different corresponding DCI sizes of the multiple hypotheses or that the size gap achieves a target loss.

24. The apparatus of any of examples 19 to 23, wherein the means for determining determines the first hypothesis based at least in part on determining whether a signal-to-noise ratio of the communication achieves a threshold.

25. A computer-readable medium, comprising code executable by one or more processors for wireless communication, the code comprising code for:
    determining a first hypothesis of multiple hypotheses for decoding a communication received in a control channel search space, wherein the multiple hypotheses are based on different corresponding downlink control information (DCI) sizes;
    decoding, based on the first hypothesis, the communication received in the control channel search space;
    extracting, for each of the multiple hypotheses and based on the different corresponding DCI sizes, information bits from the communication as decoded; and
    performing, for each extracting of the information bits, cyclic redundancy check (CRC) based on one of the different corresponding DCI sizes to determine whether extracting of the information bits yields DCI.

26. The computer-readable medium of example 25, wherein the code for determining determines the first hypothesis based at least in part on determining which of the multiple hypotheses corresponds to a largest DCI size.

27. The computer-readable medium of any of examples 25 or 26, wherein the code for determining determines the first hypothesis based at least in part on at least one of: determining the multiple hypotheses correspond to at least one of a same codeword size and a same rate match mode; or determining the multiple hypotheses correspond to one or more parameters of input LLR.

28. The computer-readable medium of any of examples 25 to 27, wherein the code for determining determines the first hypothesis based at least in part on determining that a timeline budget allows for grouping the different corresponding DCI sizes based on a DCI size of the first hypothesis.

29. The computer-readable medium of any of examples 25 to 28, wherein the code for determining determines the first hypothesis based at least in part on determining at least one of a size gap between the different corresponding DCI sizes of the multiple hypotheses or that the size gap achieves a target loss.

30. The computer-readable medium of any of examples 25 to 29, wherein the code for determining determines the first hypothesis based at least in part on determining whether a signal-to-noise ratio of the communication achieves a threshold.

What is claimed is:
1. A method of wireless communication, comprising:
    determining a first hypothesis of multiple hypotheses for decoding a communication received in a control channel search space, wherein the multiple hypotheses are based on different corresponding downlink control information (DCI) sizes;
    decoding, based on the first hypothesis, the communication received in the control channel search space;

extracting, for each of the multiple hypotheses and based on the different corresponding DCI sizes, information bits from the communication as decoded; and performing, for each extracting of the information bits, cyclic redundancy check (CRC) based on one of the different corresponding DCI sizes to determine whether extracting of the information bits yields DCI.

2. The method of claim 1, wherein determining the first hypothesis comprises determining which of the multiple hypotheses corresponds to a largest DCI size.

3. The method of claim 1, wherein determining the first hypothesis is based at least in part on determining the multiple hypotheses correspond to at least one of a same codeword size and a same rate match mode.

4. The method of claim 1, wherein determining the first hypothesis is based at least in part on determining the multiple hypotheses correspond to one or more parameters of input LLR.

5. The method of claim 1, wherein determining the first hypothesis is based at least in part on determining that a timeline budget allows for grouping the different corresponding DCI sizes based on a DCI size of the first hypothesis.

6. The method of claim 5, wherein determining that the timeline budget allows for grouping the different corresponding DCI sizes comprises determining, based on the timeline budget and from a number of configured DCI sizes, the different corresponding DCI sizes to include in the grouping.

7. The method of claim 1, wherein determining the first hypothesis is based at least in part on determining at least one of a size gap between the different corresponding DCI sizes of the multiple hypotheses or that the size gap achieves a target loss.

8. The method of claim 7, further comprising grouping, based at least in part on the size gap, the different corresponding DCI sizes of the multiple hypotheses from a number of configured DCI sizes.

9. The method of claim 1, wherein determining the first hypothesis is based at least in part on determining whether a signal-to-noise ratio of the communication achieves a threshold.

10. An apparatus for wireless communication, comprising:
a transceiver;
a memory configured to store instructions; and
one or more processors communicatively coupled with the transceiver and the memory, wherein the one or more processors are configured to:
determine a first hypothesis of multiple hypotheses for decoding a communication received in a control channel search space, wherein the multiple hypotheses are based on different corresponding downlink control information (DCI) sizes;
decode, based on the first hypothesis, the communication received in the control channel search space;
extract, for each of the multiple hypotheses and based on the different corresponding DCI sizes, information bits from the communication as decoded; and
perform, for each extracting of the information bits, cyclic redundancy check (CRC) based on one of the different corresponding DCI sizes to determine whether extracting of the information bits yields DCI.

11. The apparatus of claim 10, wherein the one or more processors are configured to determine the first hypothesis based at least in part on determining which of the multiple hypotheses corresponds to a largest DCI size.

12. The apparatus of claim 10, wherein the one or more processors are configured to determine the first hypothesis based at least in part on determining the multiple hypotheses correspond to at least one of a same codeword size and a same rate match mode.

13. The apparatus of claim 10, wherein the one or more processors are configured to determine the first hypothesis based at least in part on determining the multiple hypotheses correspond to one or more parameters of input LLR.

14. The apparatus of claim 10, wherein the one or more processors are configured to determine the first hypothesis based at least in part on determining that a timeline budget allows for grouping the different corresponding DCI sizes based on a DCI size of the first hypothesis.

15. The apparatus of claim 14, wherein determining that the timeline budget allows for grouping the different corresponding DCI sizes comprises determining, based on the timeline budget and from a number of configured DCI sizes, the different corresponding DCI sizes to include in the grouping.

16. The apparatus of claim 10, wherein the one or more processors are configured to determine the first hypothesis based at least in part on determining at least one of a size gap between the different corresponding DCI sizes of the multiple hypotheses or that the size gap achieves a target loss.

17. The apparatus of claim 16, wherein the one or more processors are further configured to group, based at least in part on the size gap, the different corresponding DCI sizes of the multiple hypotheses from a number of configured DCI sizes.

18. The apparatus of claim 10, wherein the one or more processors are configured to determine the first hypothesis based at least in part on determining whether a signal-to-noise ratio of the communication achieves a threshold.

19. An apparatus for wireless communication, comprising:
means for determining a first hypothesis of multiple hypotheses for decoding a communication received in a control channel search space, wherein the multiple hypotheses are based on different corresponding downlink control information (DCI) sizes;
means for decoding, based on the first hypothesis, the communication received in the control channel search space;
means for extracting, for each of the multiple hypotheses and based on the different corresponding DCI sizes, information bits from the communication as decoded; and
means for performing, for each extracting of the information bits, cyclic redundancy check (CRC) based on one of the different corresponding DCI sizes to determine whether extracting of the information bits yields DCI.

20. The apparatus of claim 19, wherein the means for determining determines the first hypothesis based at least in part on determining which of the multiple hypotheses corresponds to a largest DCI size.

21. The apparatus of claim 19, wherein the means for determining determines the first hypothesis based at least in part on at least one of: determining the multiple hypotheses correspond to at least one of a same codeword size and a same rate match mode; or determining the multiple hypotheses correspond to one or more parameters of input LLR.

22. The apparatus of claim 19, wherein the means for determining determines the first hypothesis based at least in part on determining that a timeline budget allows for grouping the different corresponding DCI sizes based on a DCI size of the first hypothesis.

23. The apparatus of claim 19, wherein the means for determining determines the first hypothesis based at least in part on determining at least one of a size gap between the different corresponding DCI sizes of the multiple hypotheses or that the size gap achieves a target loss.

24. The apparatus of claim 19, wherein the means for determining determines the first hypothesis based at least in part on determining whether a signal-to-noise ratio of the communication achieves a threshold.

25. A non-transitory computer-readable medium, comprising code executable by one or more processors for wireless communication, the code comprising code for:
    determining a first hypothesis of multiple hypotheses for decoding a communication received in a control channel search space, wherein the multiple hypotheses are based on different corresponding downlink control information (DCI) sizes;
    decoding, based on the first hypothesis, the communication received in the control channel search space;
    extracting, for each of the multiple hypotheses and based on the different corresponding DCI sizes, information bits from the communication as decoded; and
    performing, for each extracting of the information bits, cyclic redundancy check (CRC) based on one of the different corresponding DCI sizes to determine whether extracting of the information bits yields DCI.

26. The non-transitory computer-readable medium of claim 25, wherein the code for determining determines the first hypothesis based at least in part on determining which of the multiple hypotheses corresponds to a largest DCI size.

27. The non-transitory computer-readable medium of claim 25, wherein the code for determining determines the first hypothesis based at least in part on at least one of: determining the multiple hypotheses correspond to at least one of a same codeword size and a same rate match mode; or determining the multiple hypotheses correspond to one or more parameters of input LLR.

28. The non-transitory computer-readable medium of claim 25, wherein the code for determining determines the first hypothesis based at least in part on determining that a timeline budget allows for grouping the different corresponding DCI sizes based on a DCI size of the first hypothesis.

29. The non-transitory computer-readable medium of claim 25, wherein the code for determining determines the first hypothesis based at least in part on determining at least one of a size gap between the different corresponding DCI sizes of the multiple hypotheses or that the size gap achieves a target loss.

30. The non-transitory computer-readable medium of claim 25, wherein the code for determining determines the first hypothesis based at least in part on determining whether a signal-to-noise ratio of the communication achieves a threshold.

* * * * *